United States Patent
Koppelaar

(10) Patent No.: US 7,764,749 B2
(45) Date of Patent: Jul. 27, 2010

(54) PHASE TRACKING FOR RECEIVED SIGNALS USING ADAPTIVE INTERPOLATION

(75) Inventor: Arie Geert Cornelis Koppelaar, Eindhoven (NL)

(73) Assignee: NXP B.V., Eindhoven (NL)

( * ) Notice: Subject to any disclaimer, the term of this patent is extended or adjusted under 35 U.S.C. 154(b) by 859 days.

(21) Appl. No.: 10/557,340

(22) PCT Filed: May 17, 2004

(86) PCT No.: PCT/IB2004/050717

§ 371 (c)(1),
(2), (4) Date: Nov. 21, 2005

(87) PCT Pub. No.: WO2004/107644

PCT Pub. Date: Dec. 9, 2004

(65) Prior Publication Data

US 2006/0291594 A1    Dec. 28, 2006

(30) Foreign Application Priority Data

May 27, 2003    (EP)    .................... 03101539

(51) Int. Cl.
*H04L 27/00*    (2006.01)
(52) U.S. Cl. ........ 375/326; 375/324; 375/355; 348/536; 348/537; 348/538; 369/59.2; 369/59.22

(58) Field of Classification Search .......... 375/234, 375/261, 265, 319, 324, 326, 344, 355; 329/304, 329/306; 370/330, 347
See application file for complete search history.

(56) References Cited

U.S. PATENT DOCUMENTS

| | | | |
|---|---|---|---|
| 4,794,341 A | 12/1988 | Barton et al. | |
| 5,282,228 A | 1/1994 | Scott et al. | |
| 5,495,203 A | 2/1996 | Harp et al. | |
| 5,546,383 A | 8/1996 | Cooley et al. | |
| 5,610,948 A | 3/1997 | Ninomiya et al. | |
| 5,878,088 A * | 3/1999 | Knutson et al. | 375/324 |
| 5,963,603 A | 10/1999 | Li et al. | |
| 2002/0141482 A1 | 10/2002 | Agami et al. | |

FOREIGN PATENT DOCUMENTS

GB    2 302 779 A    1/1997

* cited by examiner

*Primary Examiner*—David C Payne
*Assistant Examiner*—Adolf Dsouza

(57) ABSTRACT

Phase trackers (7) for tracking phases of received data are provided with interpolators (20), error detectors (21,22), combiners (25) and indicator generators (26) for generating at least two streams of interpolated samples, for generating error signals per stream, and for generating an indicator signal for adjusting the interpolation, to avoid the use of sync words for phase tracking. The indicator generator (26) converts combined error signals into indicator signals for adjusting the interpolation through shifting sampling phases of interpolated samples.

9 Claims, 3 Drawing Sheets

PHASE TRACKING FOR RECEIVED SIGNALS USING ADAPTIVE INTERPOLATION

Figure 1:
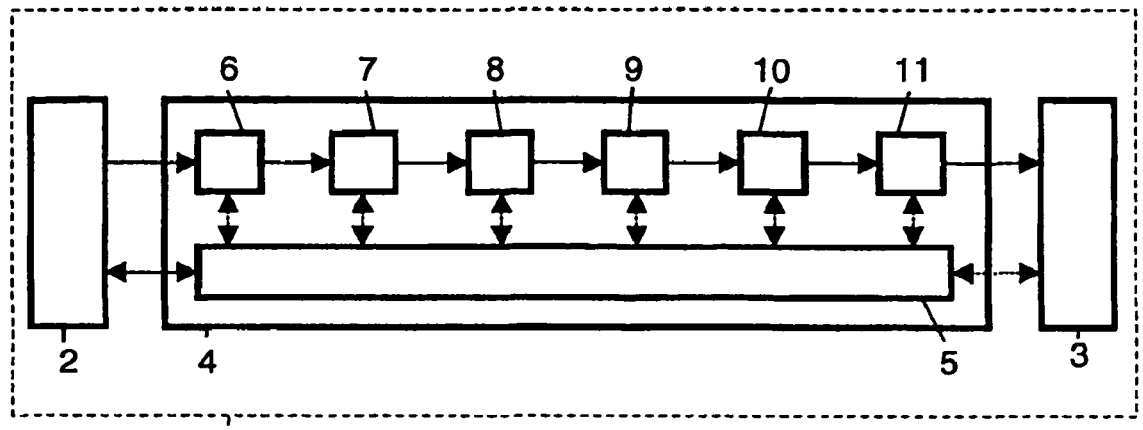

The invention relates to a system comprising a phase tracker for tracking a phase of received data.

The invention also relates to a device comprising a phase tracker, and to a phase tracker, and to a processor for tracking a phase of received data, and to a method for tracking a phase of received data, and to a processor program product for tracking a phase of received data.

The system for example corresponds with a communication system like a wired or wireless phone etc. or with a computer comprising a network interface for coupling the computer wiredly or wirelessly to a network etc. The device for example corresponds with a wired or wireless modem etc.

A prior art system is known from U.S. Pat. No. 5,963,603, which discloses parts of a wireless digital communications receiver. Via a radio frequency circuit, a down converter, a sampler and an analog-to-digital converter, data is received and converted and supplied to a phase tracker comprising an interpolator and a clock recovery and frame synchronization block. As described in its column 4, the operation of this phase tracker is based upon a sync word: this sync word is added to the data at a sending side and is previously known to and detected by the receiver. By detecting the sync word, a phase is tracked.

The known system is disadvantageous, inter alia, due to being based upon a sync word: only during receival of the sync word, the phase is tracked, during receival of the rest of the data, the phase cannot be tracked.

It is an object of the invention, inter alia, of providing a system in which the phase tracker does not depend upon the use of a sync word.

Further objects of the invention are, inter alia, providing a device in which the phase tracker does not depend upon the use of a sync word, and providing a phase tracker and a processor and a method and a processor program product which all do not depend upon the use of a sync word.

The system according to the invention comprises a phase tracker for tracking a phase of received data, which phase tracker comprises an interpolator for interpolating the received data and for generating at least two streams of interpolated samples, an error detector for in response to interpolated samples generating error signals per stream, a combiner for combining error signals and for generating combined error signals, and an indicator generator for in response to combined error signals generating an indicator signal to be supplied to the interpolator for in response to the indicator signal adjusting the interpolator.

By providing the system with the interpolator and the error detector, per stream of interpolated samples, error signals are generated. The combiner combines these error signals, and the indicator generator converts the combined error signals into the indicator signal for adjusting the interpolation. As a result, a sync word no longer is necessary (for tracking the phase, for other purposes like frame synchronization, a sync word may still be necessary), and the phase is tracked for all data, and not just during receival of the sync word. Further, the phase tracker in the system according to the invention has an advantageous minimum acquisition time interval and starts (almost) immediately with the phase tracking time interval.

A first embodiment of the system according to the invention is defined by adjusting the interpolator through shifting sampling phases of the interpolated samples. The indicator signal for example having one out of three values (up, zero, down) allows the sampling phases to be shifted most efficiently (forwardly, not, backwardly) with one or more predefined steps.

A second embodiment of the system according to the invention is defined by providing the phase tracker with an integrator. By integrating (adding) error signals, the combiner will combine integrated (added) error signals and will have to make less combinations and can operate at a lower clock speed. Further, the integrating will result in increased inaccuracies and in decreased noise. The disadvantageous increasing of inaccuracies is however ignorable compared to the advantageous decreasing of noise, as long as the integration time interval is not too large.

A third embodiment of the system according to the invention is defined by providing the combiner with a quantizer. By quantizing the combined error signals and informing the indicator generator of a previous quantization segment being left or not, and—in case of the previous quantization segment being left—informing the indicator generator of the new quantization segment requiring the sampling phase to be shifted forwardly or backwardly, the efficiency of the phase tracker according to the invention has been further improved.

A fourth embodiment of the system according to the invention is defined by providing the combiner with a filter. By filtering the combined (integrated) error signals, important error signals can be made more important and/or redundant error signals can be made more redundant.

A fifth embodiment of the system according to the invention is defined by the received data comprising in-phase data and quadrature data, with each stream of interpolated samples comprising a stream of in-phase interpolated samples and a stream of quadrature interpolated samples, and by the error detector having an advantageous simple construction.

A sixth embodiment of the system according to the invention is defined by the quantizer comprising a Phase Shift Keying Slicer and by the filter having an advantageous simple construction. The first filtering coefficient having for example an adaptable value between zero and one and the second filtering coefficient having for example a value of one minus the first filtering coefficient allow the filter to be adjusted.

Embodiments of the device according to the invention and of the phase tracker according to the invention and of the processor according to the invention and of the method according to the invention and of the processor program product according to the invention correspond with the embodiments of the system according to the invention.

The invention is based upon an insight, inter alia, that prior art phase trackers based upon sync words for determining tracking information only track phases during receival of these sync words, and is based upon a basic idea, inter alia, that the use of sync words for phase tracking can be avoided by generating at least two streams of interpolated samples, generating error signals per stream, and, in response to combined error signals, generating an indicator signal for adjusting the interpolation.

The invention solves the problem, inter alia, of providing a system with a phase tracker which does not depend upon the use of a sync word, and is advantageous, inter alia, in that the system with the phase tracker tracks the phase all the time and not just during receival of a sync word and has a minimum acquisition time interval and starts (almost) immediately with the phase tracking time interval.

These and other aspects of the invention will be apparent from and elucidated with reference to the embodiments(s) described hereinafter.

Figure 2:
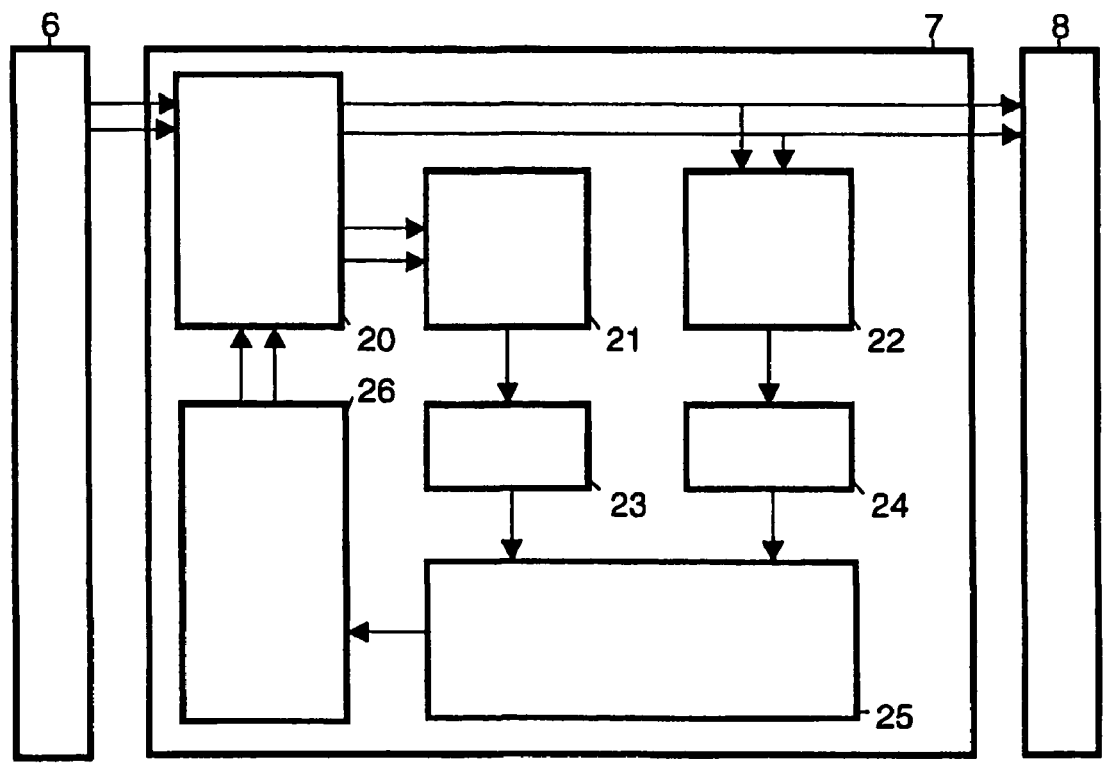
Figure 3:
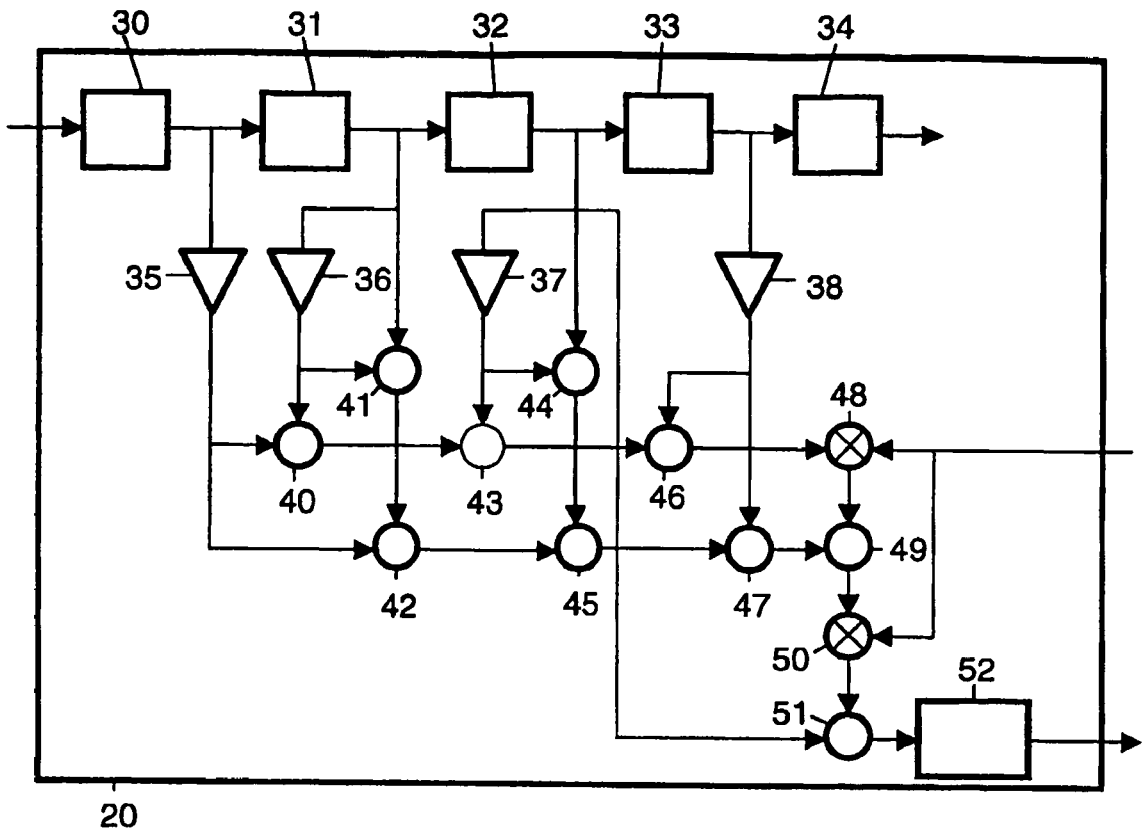
Figure 4:
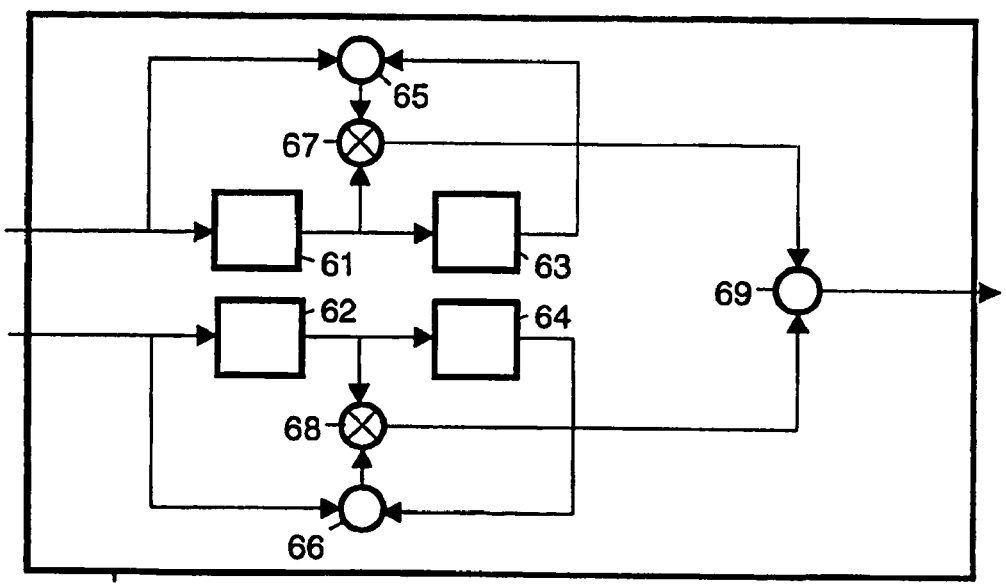
Figure 5:
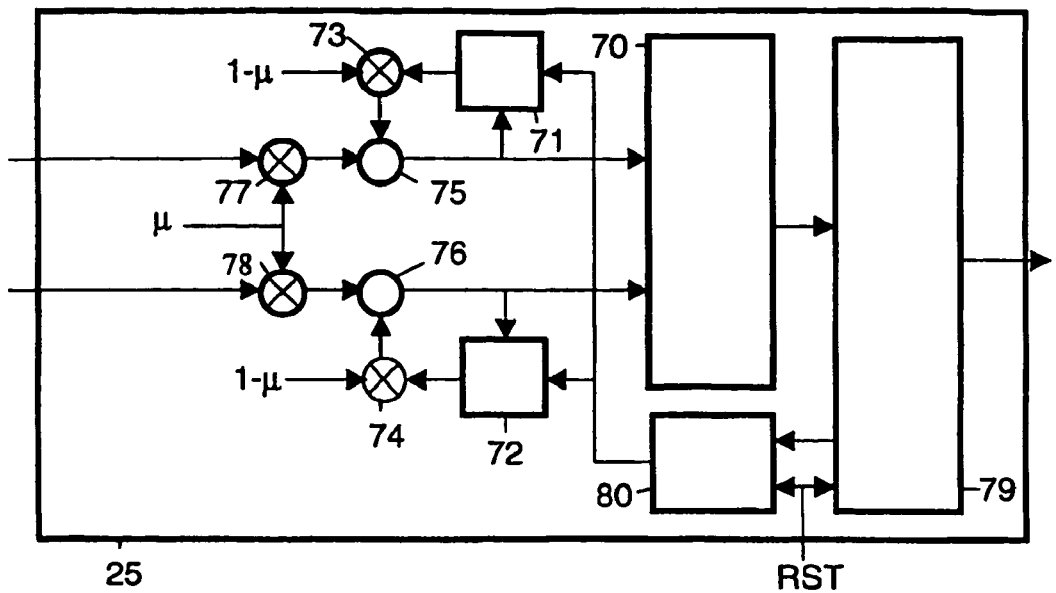
Figure 6:
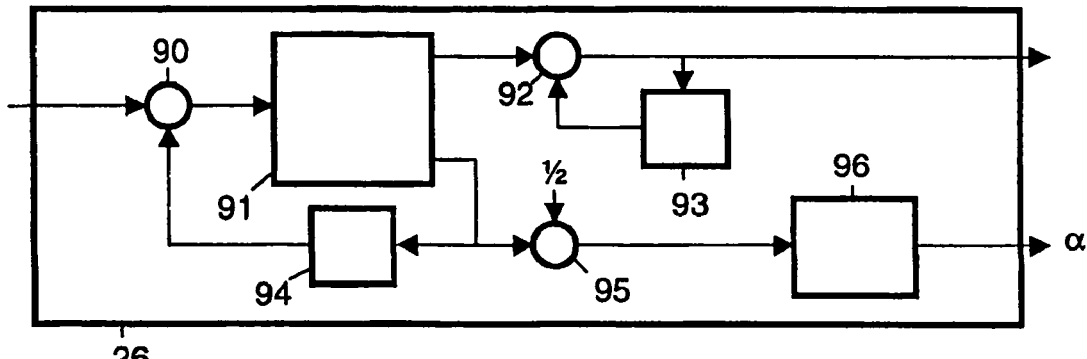
Figure 7:
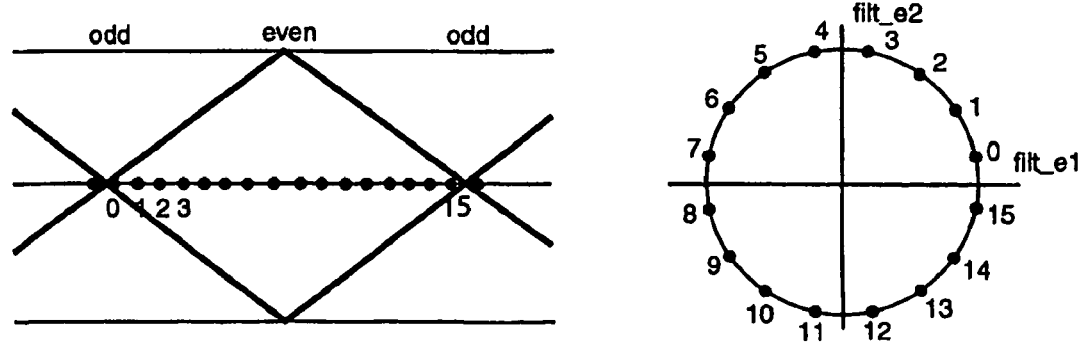

FIG. 1 shows in block diagram form a system according to the invention comprising a phase tracker according to the invention, FIG. 2 shows in block diagram form a phase tracker according to the invention for use in the system according to the invention, FIG. 3 shows in block diagram form an interpolator for use in the phase tracker according to the invention, FIG. 4 shows in block diagram form an error detector for use in the phase tracker according to the invention, FIG. 5 shows in block diagram form a combiner for use in the phase tracker according to the invention, FIG. 6 shows in block diagram form an indicator generator for use in the phase tracker according to the invention, and FIG. 7 shows interpolation samples and phase shifts in relation to quantization segments located on a circle as defined by a quantizer in the form of a Phase Shift Keying Slicer.

The system 1 according to the invention shown in FIG. 1 comprises a radio frequency interface 2, a hardware interface 3 and a receiver 4. Receiver 4 comprises a controller 5, a fine automatic gain control unit 6, a phase tracker 7 (chip recovery unit), a carrier recovery unit 8, an equalizer 9, a demodulator 10 and a controlling unit 11 which may or may not form part of controller 5. An input of fine automatic gain control unit 6 is coupled to an output of radio frequency interface 2, and an output of fine automatic gain control unit 6 is coupled to an input of phase tracker 7. An output of phase tracker 7 is coupled to an input of carrier recovery unit 8, and an output of carrier recovery unit 8 is coupled to an input of equalizer 9. An output of equalizer 9 is coupled to an input of demodulator 10, and an output of demodulator 10 is coupled to an input of controlling unit 11, of which an output is coupled to an input of hardware interface 3. Controller 5 is coupled to each one of interfaces 2 and 3 and blocks 6-11 for controlling purposes.

The fine automatic gain control unit 6 performs several functions, like an adjustment of a received signal power, a mapping of the m bits (for example m=8) from the radio frequency interface 2 to the n effective bits (for example n=6) required by the receiver 4, an avoidance of clipping of the signals after gain correction, and a provision of a preliminary gain adjustment early in the power measurement and correction process, to prevent large variations of the signal power. The phase tracker 7 measures and tracks the sampling phase and tracks this, and assures that in spite of sample clock inaccuracies the sampling phase will be kept constant. The carrier recovery unit 8 corrects for a carrier frequency error and uses a Barker despreader and an initial frequency estimator for initialization, and obtains symbol synchronization during the preamble interval. The equalizer 9 will derive the optimum sampling phase and comprises a feed-forward part and a decision feedback part, and is trained during a short or long preamble interval, before the data arrives during the data interval. The demodulator 10 is not operational during the preamble interval, and decodes or translates during the data interval.

The phase tracker 7 according to the invention shown in FIG. 2 comprises an interpolator 20, of which a data input is coupled to an output of fine automatic gain control unit 6 and of which a control input is coupled to an output of an indicator generator 26 and of which an output is coupled to inputs of error detectors 21 and 22 and of carrier recovery unit 8. Outputs of error detectors 21 and 22 are coupled via integrators 23 and 24 to inputs of combiner 25, of which an output is coupled to an input of indicator generator 26. The functioning of phase tracker 7 will be explained in view of FIG. 3-7.

The interpolator 20 shown in FIG. 3 for performing a piecewise quadratic interpolation comprises five or more serial delay elements 30-34. A data input of delay element 30 receives data from fine automatic gain control unit 6. Outputs of respective delay elements 30-33 are coupled to inputs of respective amplifiers 35-38 which amplify with a factor ½. An output of amplifier 35 is coupled to a positive (adding) input of an adder 40 and to a negative (subtracting) input of an adder 42. An output of amplifier 36 is coupled to a negative (subtracting) input of adder 40 and to a positive (adding) input of an adder 41. The output of delay element 31 is further coupled to a further positive (adding) input of adder 41. An output of adder 41 is coupled to a positive (adding) input of adder 42, and an output of adder 40 is coupled to a positive (adding) input of an adder 43, and an output of adder 42 is coupled to a positive (adding) input of an adder 45. An output of amplifier 37 is coupled to a negative (subtracting) input of adder 43 and to a positive (adding) input of an adder 44. The output of delay element 32 is further coupled to a negative (subtracting) input of adder 44 and to a positive (adding) input of an adder 51. An output of adder 44 is coupled to a further positive (adding) input of adder 45, and an output of adder 43 is coupled to a positive (adding) input of an adder 46, and an output of adder 45 is coupled to a positive (adding) input of an adder 47. An output of amplifier 38 is coupled to a negative (subtracting) input of adder 47 and to a further positive (adding) input of adder 46. An output of adder 46 is coupled to an input of a multiplier 48, of which an output is coupled to a positive (adding) input of an adder 49. An output of adder 47 is coupled to a further positive (adding) input of adder 49, of which an output is coupled to an input of a multiplier 50. An output of multiplier 50 is coupled to a further positive (adding) input of adder 51, of which an output transmits interpolated samples via a rounder 52 (for rounding off purposes) to error detector 21,22 and/or equalizer 8. Further inputs of multipliers 48 and 50 receive an indicator signal α from indicator generator 26.

Interpolator 20 interpolates the received data and generates at least two streams of interpolated samples (for different sampling phases) in dependence of the indicator signal α defining a shift of a sampling phase for the interpolated samples. To get two streams of interpolated samples, a first stream is generated for α, and a second stream is generated for α+90°. Thereto, interpolator 20 as shown in FIG. 3 is either multiplexed in space (constructed twice for α and α+90°—whereby certain single parts may be used for both constructions) or multiplexed in time (used twice for α and α+90°). In case of the received data comprising in-phase data and quadrature data, two in-phase streams and two quadrature streams will have to be made, etc.

Delay elements 30-34 for example form part of a shift register. Due to sometimes a getting smaller than 0° or getting larger than 180°, it will be necessary to shift the shift register one delay element to the left or to the right.

Alternatively, interpolator may perform a linear interpolation, and/or more than two streams may be created (for example for α and α+60° and α+120°), and/or different values for α may be used (for example α and α+80° or α and α+100°) etc.

The error detector 20,21 shown in FIG. 4 is drawn for the situation wherein the received data comprises in-phase data and quadrature data, with each stream of interpolated samples comprising a stream of in-phase interpolated samples and a stream of quadrature interpolated samples. Error detector 21,22 comprises a first delay element 61 for receiving the in-phase interpolated samples and a second delay element 62 for receiving the quadrature interpolated samples, with an input of the first delay element 61 being coupled to a positive (adding) input of an adder 65, with an input of the second delay element 62 being coupled to a positive (adding) input of an adder 66, with an output of the first delay element 61 being coupled to an input of a third delay element 63, with an output of the second delay element 62 being coupled to an input of a fourth delay element 64, with an output of the third delay element 63 being coupled to a negative (subtracting) input of the adder 65, with an output of the fourth delay element 64 being coupled to a negative (subtracting) input of the adder 66, with an output of the first adder 65 being coupled to a first input of a multiplier 67, with an output of the second adder 66 being coupled to a first input of a multiplier 68, with a second input of the multiplier 67 being coupled to the output of the first delay element 61, with a second input of the multiplier 68 being coupled to the output of the second delay element 62, with an output of the first multiplier 67 being coupled to a positive (adding) input of an adder 69, with an output of the multiplier 68 being coupled to a further positive (adding) input of the adder 69, which adder 69 comprises an output for generating the error signals to be supplied to the integrator 23,24.

Error detector 21,22 as shown in FIG. 4 is either multiplexed in space (constructed twice for $\alpha$ and $\alpha+90°$) in which case there will be two separate error detectors 21 and 22 or multiplexed in time (used twice for $\alpha$ and $\alpha+90°$) in which case there will be one error detector 21.

The combiner 25 shown in FIG. 5 comprises a quantizer 70 in the form of a Phase Shift Keying Slicer and a filter 71-78 comprising a fifth 71 and a sixth 72 delay element, with an output of the fifth delay element 71 being coupled to a first input of a multiplier 73, with an output of the sixth delay element 72 being coupled to a first input of a multiplier 74, with an output of the multiplier 73 being coupled to a first positive (adding) input of an adder 75, with an output of the multiplier 74 being coupled to a first positive (adding) input of an adder 76, with an output of the adder 75 being coupled to an input of the fifth delay element 71 and to a first input of the Phase Shift Keying Slicer, with an output of the adder 76 being coupled to an input of the sixth delay element 72 and to a second input of the Phase Shift Keying Slicer, with a second positive (adding) input of the adder 75 being coupled to an output of a multiplier 77, with a second positive (adding) input of the adder 76 being coupled to an output of a multiplier 78, which multiplier 77 comprises a first input for receiving first error signals from error detector 21 and a second input for receiving a first filtering coefficient $\mu$, which multiplier 78 comprises a first input for receiving second error signals from error detector 22 and a second input for receiving the first filtering coefficient $\mu$, which multiplier 73 comprises a second input for receiving a second filtering coefficient $1-\mu$, which multiplier 74 comprises a second input for receiving the second filtering coefficient $1-\mu$, with the fifth (71) and sixth (72) delay element being resettable in response to two reset signals originating via a gate 80 (AND), a general reset signal to be supplied to both the gate 80 and to a finite state machine 79, and a specific reset signal coming from this finite state machine 79. An output of the Phase Shift Keying Slicer is coupled to an input of the finite state machine 79, of which an output generates combined error signals to be supplied to the indicator generator 26.

By filtering the combined (integrated) error signals via filter 71-78, important error signals can be made more important and/or redundant error signals can be made more redundant. The first filtering coefficient having for example an adaptable value $\mu$ between zero and one and the second filtering coefficient $1-\mu$ having for example a value of one minus the first filtering coefficient allow the filter to be adjusted.

The Phase Shift Keying Slicer quantizes the phases between two odd (or two even) samples into sixteen phase segments 0-15, as shown in FIG. 7. In case of a phase segment being amended, a different indicator signal $\alpha$ is generated by indicator generator 26 as shown in FIG. 6 and supplied to interpolator 20 for adjusting the interpolation.

The finite state machine 79 for example comprises three states, an initialization state, an action state and a wait state. Initially and after a reset, the finite state machine 79 is in the initialization state. A transition takes place every time new integrated error signals are provided to multipliers 77,78. Default this will be for example every 1024 samples (one period of integration time). The transition from initialization state to action state 1 will always take place and during this transition the measured sampling phase (output Phase Shift Keying Slicer) will be assigned to the reference phase. A transition from action state to wait state will take place in case of the difference between the reference phase and the measured sampling phase being smaller than a predefined value (but larger than zero). The combined error signal (output finite state machine 79) will be equal to sign(difference)·⅛. A counter which counts the number of successive violations of the difference being smaller than the predefined value (but larger than zero) will be resetted (there is no violation in this case). Since a new interpolation will be used for the determination of the integrated error values the filters which filter these values will be resetted. No transition from the action state will take place in case of the difference being zero and no modification of the interpolation is required (there is no violation of the difference being smaller than the predefined value and larger than zero, so the counter is resetted), and in case the difference is larger than the predefined value (an unexpected large difference between the reference phase and the measured phase has occurred, and no further action is carried out). A transition from wait state to action state will take place after the wait state has lasted one period of integration time. The indicator generator 26 shown in FIG. 6 comprises an adder 90 with a first positive (adding) input for receiving the combined error signal (±(difference)·⅛) from finite state machine 79. An output of adder 90 is coupled to an input of a detector 91 for detecting its input signal being between −0.5 and +0.5 and if yes letting pass this input signal unamendedly and if no limiting this input signal to a value between −0.5 and +0.5. An first output of detector 91 is coupled to a first positive (adding) input of an adder 92, of which a second positive (adding) input is coupled to an output of a delay element 93. An output of adder 92 is coupled to an input of the delay element 93 and generates a sample number signal indicating that shift register 30-34 is to be shifted or not, as discussed for FIG. 3. A second output of detector 91 is coupled to an input of a delay element 94 and to a first positive (adding) input of an adder 95. An output of delay element 94 is coupled to a second positive (adding) input of adder 90. A second positive (adding) input of adder 95 receives a signal with a value 0.5, and an output of this adder 95 is coupled to a rounder 96 (for rounding off purposes). Rounder 96 generates the indicator signal $\alpha$ to be supplied to interpolator 20. Detector 91 for example comprises a modulo operator, which in response to an input signal >0.5 generates an output signal equal to its input signal minus one at its second output and increases the sample number signal via its first output with a value +1. In response to an input signal <−0.5 detector 91 generates an output signal equal to its input signal plus one at its second output and increases the sample number signal via its first output with a value −1 (in other words decreases this sample number signal with a value 1).

The interpolation samples and phase shifts shown in FIG. 7 have already been discussed while discussing FIG. 5.

The received data may comprise audio and/or video and/or other info. Instead of constructing the entire phase tracker 7 through hardware, one or more parts of phase tracker 7 may be realized in the form of software running via a processor. So, each one of the interpolator 20, the error detector 21,22, the combiner 25 and the indicator generator 26 respectively may alternatively or in addition correspond with a step or a function of interpolating, generating error signals, combining error signals and generating combined error signals, and generating an indicator signal, respectively. The received data may comprise in-phase data and quadrature data, or not. The received data will be oversampled with at least a factor two or more. Interpolator 20 and error detectors 21,22 will operate at a clock frequency of for example 22 MHz, integrators 23,24 will operate at a clock frequency of for example 11 MHz (with the period of integration time being 1024 samples), and combiner 25 and indicator generator 26 will operate at a clock frequency of for example 11 kHz.

The expression "for" in for example "for A" and "for B" does not exclude that other functions "for C" etc. are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention is based upon an insight, inter alia, that prior art phase trackers based upon sync words for determining tracking information only track phases during receival of these sync words, and is based upon a basic idea, inter alia, that the use of sync words for phase tracking can be avoided by generating at least two streams of interpolated samples, generating error signals per stream, and, in response to combined error signals, generating an indicator signal for adjusting the interpolation.

The invention solves the problem, inter alia, of providing a system with a phase tracker which does not depend upon the use of a sync word, and is advantageous, inter alia, in that the system with the phase tracker tracks the phase all the time and not just during receival of a sync word and has a minimum acquisition time interval and starts (almost) immediately with the phase tracking time interval.

The invention claimed is:

1. A system comprising a phase tracker for tracking a phase of received data, which phase tracker comprises:

an interpolator for interpolating the received data and for generating at least two streams of interpolated samples, an error detector, in response to interpolated samples, generating error signals per stream, a combiner for combining error signals and for generating a combined error signal, and a indicator generator, in response to the combined error signal, generating an indicator signal to be supplied to the interpolator for, in response to the indicator signal, adjusting the interpolator;

wherein the combiner comprises a quantizer for quantizing the error signals;

wherein the combiner comprises a filter for filtering the error signals and for generating filtered error signals to be supplied to the quantizer;

wherein the received data comprises in-phase data and quadrature data, with each stream of interpolated samples comprising a stream of in-phase interpolated samples and a stream of quadrature interpolated samples, and with the error detector comprising a first delay element for receiving the in-phase interpolated samples and a second delay element for receiving the quadrature interpolated samples, with an input of the first delay element being coupled to a positive input of a second adder, with an output of the first delay element being coupled to an input of a third delay element, with an output of the second delay element being coupled to an input of a fourth delay element with an output of the third delay element being coupled to a negative input of the first adder, with an output of the fourth delay element being coupled to a negative input of the second adder, with an output of the first adder being coupled to a first input of a first multiplier, with an output of the second adder being coupled to a first input of a second multiplier, with a second input of the first multiplier being coupled to the output of the first delay element, with a second input of the second multiplier being coupled to the output of the second delay element, with an output of the first multiplier being coupled to a first positive input of a third adder, with an output of the second multiplier being coupled to a second positive input of the third adder, which third adder comprises an output for generating the error signals to be supplied to the integrator.

2. The system according to claim 1, wherein the adjusting of the interpolator comprises a shift of a sampling phase of the interpolated samples.

3. The system according to claim 1, wherein the phase tracker comprises an integrator for integrating error signals.

4. The system according to claim 1, wherein the quantizer comprises a Phase Shift Keying Slicer, with the filter comprising a fifth and a sixth delay element, with an output of the fifth delay element being coupled to a first input of a third multiplier, with an output of the sixth delay element being coupled to a first input of a fourth multiplier, with an output of the third multiplier being coupled to a first positive input of a fourth adder, with an output of the fourth multiplier being coupled to a first positive input of a fifth delay element, with an output of the fourth adder being coupled to an input of the fifth delay element and to a first input of the Phase Shift Keying Slicer, with an output of the fifth adder being coupled to an input of the sixth delay element and a second input of the Phase Shift Keying Slicer, with a second positive input of the fourth adder being coupled to an output of a fifth multiplier with a second positive input of the fifth adder being coupled to an output of a sixth multiplier, with the fifth multiplier comprises a first input for receiving first error signals and a second input for receiving a first filtering coefficient (μ), which the third multiplier comprises a second input for receiving a second filtering coefficient (1−μ), which fourth multiplier comprises a second input for receiving the second filtering coefficient (1−μ), with the fifth and sixth delay element being resettable.

5. A device comprising a phase tracker for tracking a phase of received data, which phase tracker comprises:
   an interpolator for interpolating the received data and for generating at least two streams of interpolated samples,
   an error detector, in response to interpolated samples, generating error signals per stream,
   a combiner for combining error signals and for generating a combined error signal, and
   an indicator generator, in response to combined error signal, generating an indicator signal to be supplied to the interpolator for adjusting the interpolator in response to the indicator signal;
   wherein the combiner comprises a quantizer for quantizing the error signals;
   wherein the combiner comprises a filter for filtering the error signals and for generating filtered error signals to be supplied to the quantizer; and
   wherein the received data comprises in-phase data and quadrature data, with each stream of interpolated samples comprising a stream of in-phase interpolated samples and a stream of quadrature interpolated samples, and with the error detector comprising a first delay element for receiving the in-phase interpolated samples and a second delay element for receiving the quadrature interpolated samples, with an input of the first delay element being coupled to a positive input of a second adder, with an output of the first delay element being coupled to an input of a third delay element, with an output of the second delay element being coupled to an input of a fourth delay element with an output of the third delay element being coupled to a negative input of the first adder, with an output of the fourth delay element being coupled to a negative input of the second adder, with an output of the first adder being coupled to a first input of a first multiplier, with an output of the second adder being coupled to a first input of a second multiplier, with a second input of the first multiplier being coupled to the output of the first delay element, with a second input of the second multiplier being coupled to the output of the second delay element, with an output of the first multiplier being coupled to a first positive input of a third adder, with an output of the second multiplier being coupled to a second positive input of the third adder, which third adder comprises an output for generating the error signals to be supplied to the integrator.

6. A processor for tracking a phase of received data, which processor comprises:
   an interpolator for interpolating the received data and for generating at least two streams of interpolated samples,
   an error detector generating error signals per stream in response to said interpolated samples,
   a combiner for combining error signals and for generating a combined error signal, and
   an indicator generator generating an indicator signal to be supplied to the interpolator in response to the combined error signal, said interpolator, for in response to the indicator, signal adjusting the interpolator;
   wherein the combiner comprises a quantizer for quantizing the error signals;
   wherein the combiner comprises a filter for filtering the error signals and for generating filtered error signals to be supplied to the quantizer; and
   wherein the received data comprises in-phase data and quadrature data, with each stream of interpolated samples comprising a stream of in-phase interpolated samples and a stream of quadrature interpolated samples, and with the error detector comprising a first delay element for receiving the in-phase interpolated samples and a second delay element for receiving the quadrature interpolated samples, with an input of the first delay element being coupled to a positive input of a second adder, with an output of the first delay element being coupled to an input of a third delay element, with an output of the second delay element being coupled to an input of a fourth delay element with an output of the third delay element being coupled to a negative input of the first adder, with an output of the fourth delay element being coupled to a negative input of the second adder, with an output of the first adder being coupled to a first input of a first multiplier, with an output of the second adder being coupled to a first input of a second multiplier, with a second input of the first multiplier being coupled to the output of the first delay element, with a second input of the second multiplier being coupled to the output of the second delay element, with an output of the first multiplier being coupled to a first positive input of a third adder, with an output of the second multiplier being coupled to a second positive input of the third adder, which third adder comprises an output for generating the error signals to be supplied to the integrator.

7. A method for tracking a phase of a received signal, the method comprising:
   using an interpolator of a phase tracker, interpolating the received data and for generating at least two streams of interpolated samples,
   using an error detector of the phase tracker, in response to interpolated samples generating error signals per stream,
   using a combiner of the phase tracker, combining error signals and for generating a combined error signal, and
   using an indicator generator of the phase tracker, in response to the combined error signal generating an indicator signal for adjusting said interpolating in response to the indicator signal;
   wherein the combiner comprises a quantizer for quantizing the error signals;
   wherein the combiner comprises a filter for filtering the error signals and for generating filtered error signals to be supplied to the quantizer; and
   wherein the received data comprises in-phase data and quadrature data, with each stream of interpolated samples comprising a stream of in-phase interpolated samples and a stream of quadrature interpolated samples, and with the error detector comprising a first delay element for receiving the in-phase interpolated samples and a second delay element for receiving the quadrature interpolated samples, with an input of the first delay element being coupled to a positive input of a second adder, with an output of the first delay element being coupled to an input of a third delay element, with an output of the second delay element being coupled to an input of a fourth delay element with an output of the third delay element being coupled to a negative input of the first adder, with an output of the fourth delay element being coupled to a negative input of the second adder, with an output of the first adder being coupled to a first input of a first multiplier, with an output of the second adder being coupled to a first input of a second multiplier, with a second input of the first multiplier being coupled to the output of the first delay element, with a second input of the second multiplier being coupled to the output of the second delay element, with an output of the first multiplier being coupled to a first positive input of a third adder, with an output of the second multiplier being coupled to a second positive input of the third adder, which third adder comprises an output for generating the error signals to be supplied to the integrator.

8. A processor program product for tracking a phase of a received signal, which processor program product comprises the functions of:
- using an interpolator of a phase tracker, interpolating the received data and generating at least two streams of interpolated samples,
- using an error detector of the phase tracker, in response to interpolated samples generating error signals per stream,
- using a combiner of the phase tracker, combining error signals and generating a combined error signal, and
- using an indicator generator of the phase tracker, in response to the combined error signal generating an indicator signal for adjusting the interpolating;
- wherein the combiner comprises a quantizer for quantizing the error signals;
- wherein the combiner comprises a filter for filtering the error signals and for generating filtered error signals to be supplied to the quantizer; and
- wherein the received data comprises in-phase data and quadrature data, with each stream of interpolated samples comprising a stream of in-phase interpolated samples and a stream of quadrature interpolated samples, and with the error detector comprising a first delay element for receiving the in-phase interpolated samples and a second delay element for receiving the quadrature interpolated samples, with an input of the first delay element being coupled to a positive input of a second adder, with an output of the first delay element being coupled to an input of a third delay element, with an output of the second delay element being coupled to an input of a fourth delay element with an output of the third delay element being coupled to a negative input of the first adder, with an output of the fourth delay element being coupled to a negative input of the second adder, with an output of the first adder being coupled to a first input of a first multiplier, with an output of the second adder being coupled to a first input of a second multiplier, with a second input of the first multiplier being coupled to the output of the first delay element, with a second input of the second multiplier being coupled to the output of the second delay element, with an output of the first multiplier being coupled to a first positive input of a third adder, with an output of the second multiplier being coupled to a second positive input of the third adder, which third adder comprises an output for generating the error signals to be supplied to the integrator.

9. A system comprising a phase tracker for tracking a phase of received data, which phase tracker comprises:
- an interpolator for interpolating the received data and for generating at least two streams of interpolated samples,
- an error detector, in response to interpolated samples, generating error signals per stream,
- a combiner for combining error signals and for generating a combined error signal, and
- a indicator generator, in response to the combined error signal, generating an indicator signal to be supplied to the interpolator for, in response to the indicator signal, adjusting the interpolator;
- wherein the combiner comprises a quantizer for quantizing the error signals and a filter for filtering the error signals and for generating filtered error signals to be supplied to the quantizer;
- wherein the received data comprises in-phase data and quadrature data, with each stream of interpolated samples comprising a stream of in-phase interpolated samples and a stream of quadrature interpolated samples, and with the error detector comprising a first delay element for receiving the in-phase interpolated samples and a second delay element for receiving the quadrature interpolated samples, with an input of the first delay element being coupled to a positive input of a second adder, with an output of the first delay element being coupled to an input of a third delay element, with an output of the second delay element being coupled to an input of a fourth delay element with an output of the third delay element being coupled to a negative input of the first adder, with an output of the fourth delay element being coupled to a negative input of the second adder, with an output of the first adder being coupled to a first input of a first multiplier, with an output of the second adder being coupled to a first input of a second multiplier, with a second input of the first multiplier being coupled to the output of the first delay element, with a second input of the second multiplier being coupled to the output of the second delay element, with an output of the first multiplier being coupled to a first positive input of a third adder, with an output of the second multiplier being coupled to a second positive input of the third adder, which third adder comprises an output for generating the error signals to be supplied to the integrator.

* * * * *